United States Patent
Chen et al.

(10) Patent No.: US 10,846,540 B2
(45) Date of Patent: *Nov. 24, 2020

(54) LANE LEVEL TRAFFIC

(71) Applicant: HERE GLOBAL B.V., Eindhoven (NL)

(72) Inventors: Xin Chen, Evanston, IL (US); Xiang Ma, Chicago, IL (US); Roman Ostrovskiy, Prospect Heights, IL (US); Terence Zhao, Hoffman Estates, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/686,297

(22) Filed: Aug. 25, 2017

(65) Prior Publication Data

US 2017/0372148 A1    Dec. 28, 2017

Related U.S. Application Data

(63) Continuation-in-part of application No. 14/324,797, filed on Jul. 7, 2014, now Pat. No. 9,747,505.

(51) Int. Cl.
*G06K 9/00* (2006.01)
*G08G 1/01* (2006.01)
*G06T 17/05* (2011.01)

(52) U.S. Cl.
CPC ..... *G06K 9/00791* (2013.01); *G06K 9/00785* (2013.01); *G06T 17/05* (2013.01); *G08G 1/0104* (2013.01)

(58) Field of Classification Search
CPC ............ G06K 9/00785; G06K 9/00791; G06T 17/05; G08G 1/0104
See application file for complete search history.

(56) References Cited

U.S. PATENT DOCUMENTS

| | | | |
|---|---|---|---|
| 5,434,927 A * | 7/1995 | Brady | G08G 1/015 382/104 |
| 5,774,569 A | 6/1998 | Waldenmaier | |
| 5,999,635 A | 12/1999 | Higashikubo | |
| 5,999,877 A | 12/1999 | Takahashi et al. | |
| 6,760,061 B1 | 7/2004 | Giler et al. | |
| 6,785,606 B2 | 8/2004 | DeKock et al. | |
| 6,975,749 B2 * | 12/2005 | Chujoh | G08G 1/04 340/917 |

(Continued)

OTHER PUBLICATIONS

Song et al., Dynamic Calibration of Pan-Tilt-Zoom Cameras for Traffic Monitoring, IEEE, IEEE Transaction on Systems, Man, and Cybernetics, Part B (Cybernetics) vol. 36, Issue: 5, Oct. 2006 (Year: 2006).*

(Continued)

*Primary Examiner* — Francis Geroleo
(74) *Attorney, Agent, or Firm* — Alston & Bird LLP

(57) ABSTRACT

Lane level traffic levels are determined based on traffic camera images. A controller aligns a three-dimensional map with a traffic camera view, and identifies multiple lanes in the traffic camera view based on lane delineations of the three-dimensional map. The controller calculates a traffic parameter based on the multiple lanes in image frames from the traffic camera view and provides a traffic graphic based on the traffic parameter.

25 Claims, 10 Drawing Sheets

| FUNCTIONAL CLASS | TRAFFIC LEVEL | AREA OF INTEREST |
|---|---|---|
| 1 | 1-3 | 1.0 |
| 1 | 4 | 0.8 |
| 1 | 5 | 0.6 |
| 2 | 1-3 | 0.7 |
| 2 | 4-5 | 0.5 |
| 3 | 1-3 | 1.0 |
| 3 | 4-5 | 0.5 |

(56) References Cited

U.S. PATENT DOCUMENTS

| | | |
|---|---|---|
| 7,116,326 B2 | 10/2006 | Soulchin et al. |
| 7,920,959 B1 | 4/2011 | Williams |
| 8,237,791 B2 | 8/2012 | Chen et al. |
| 8,669,885 B2 | 3/2014 | Swope, III et al. |
| 9,747,505 B2 | 8/2017 | Chen et al. |
| 2007/0208495 A1* | 9/2007 | Chapman ............. G08G 1/0104 701/117 |
| 2007/0257819 A1 | 11/2007 | Manor |
| 2009/0237510 A1 | 9/2009 | Chen et al. |
| 2010/0322476 A1 | 12/2010 | Kanhere et al. |
| 2011/0164789 A1 | 7/2011 | Robert |
| 2012/0148094 A1* | 6/2012 | Huang ................... G08G 1/054 382/103 |
| 2012/0276847 A1 | 11/2012 | Peterson |
| 2013/0073192 A1* | 3/2013 | Hota ........................ G08G 1/04 701/118 |
| 2013/0282264 A1 | 10/2013 | Bastiaensen et al. |
| 2013/0342706 A1 | 12/2013 | Hoover et al. |
| 2014/0266803 A1* | 9/2014 | Bulan ................. G06K 9/00785 340/932.2 |
| 2014/0313347 A1 | 10/2014 | Wu et al. |
| 2014/0362222 A1* | 12/2014 | Swaminathan ...... G08G 1/0145 348/149 |
| 2015/0161886 A1 | 6/2015 | Kesting et al. |

OTHER PUBLICATIONS

Office Action for European Application No. 15169123.5 dated Jun. 19, 2018, 6 pages.

Aharon Bar Hillel et al: "Recent progress in road and lane detection: a survey," Machine Vision and Applications, vol. 25, No. 3, Apr. 1, 2014, pp. 727-745, XP055113665.

Anonymous: "Camera calibration—Wikipedia, the free encyclopedia," Oct. 5, 2015, Retrieved from the Internet. https://en.wikipedia.org/wiki/Camera_resectioning [retrieved on Nov. 24, 2015].

Dailey D J et al: "Dynamic camera calibration of roadside traffic management cameras for vehicle speed estimation," IEEE Transactions on Intelligent Transportation Systems, IEEE, Piscataway, NJ, USA, vol. 3, No. 2, Jun. 1, 2003, pp. 90-98, XP011104438.

European Search Report for related European Application No. 15169123.5, dated Dec. 8, 2015, 8 pages.

Fung et al., *Camera calibration from road lane markings*, Oct. 2003, Society of Photo-Optical Instrumentation Engineers, pp. 2967-2977.

Kastrinaki V et al: "A survey of video processing techniques for traffic applications," Image and Vision Computing, Elsevier, Guildford, GB, vol. 21, No. 4, Apr. 1, 2003, pp. 359-381.

Notice of Allowance for corresponding U.S. Appl. No. 14/324,797 dated Apr. 27, 2017.

Office Action for corresponding U.S. Appl. No. 14/324,797 dated Dec. 30, 2016.

Office Action for corresponding U.S. Appl. No. 14/324,797 dated Jun. 17, 2016.

Soren Kammel et al: "Lidar-based lane marker detection and mapping," Intelligent Vehicles Symposium, 2008 IEEE, Piscataway, NJ, USA, Jun. 4, 2008, pp. 1137-1142, XP031318963.

Yao-Jan Wu et al: "Traffic Monitoring and Vehicle Tracking using Roadside Cameras," 2006 IEEE Conference on Systems, Man, and Cybernetics, Oct. 8-11, 2006, Taipei, Taiwan, IEEE, Piscataway, NJ, USA, Oct. 1, 2006, pp. 4631-4636, XP031117689.

Office Action for European Application No. 15169123.5 dated Aug. 24, 2020, 6 pages.

\* cited by examiner

| TRAFFIC LEVEL | TRAFFIC SPEED | TRAFFIC DENSITY | TRAFFIC FLOW |
|---|---|---|---|
| 1 | 60 mph | 1 | 100 |
| 2 | 40 mph | 2 | 50 |
| 3 | 20 mph | 3 | 20 |
| 4 | 10 mph | 4 | 10 |
| 5 | 5 mph | 5 | 5 |

FIG. 6A

| FUNCTIONAL CLASS | TRAFFIC LEVEL | AREA OF INTEREST |
|---|---|---|
| 1 | 1-3 | 1.0 |
| 1 | 4 | 0.8 |
| 1 | 5 | 0.6 |
| 2 | 1-3 | 0.7 |
| 2 | 4-5 | 0.5 |
| 3 | 1-3 | 1.0 |
| 3 | 4-5 | 0.5 |

FIG. 6B

LANE LEVEL TRAFFIC

CROSS-REFERENCE TO RELATED APPLICATIONS

This application is a continuation of U.S. application Ser. No. 14/324,797, filed Jul. 7, 2014, the entire contents of which are incorporated herein by reference.

FIELD

The following disclosure relates to the calculation of a traffic parameter from a camera view, or more particularly, the calculation of lane level traffic parameters from the coordination of three dimensional map data with a camera view.

BACKGROUND

Traffic technology is the study of movement of vehicles on the roads. Analytical techniques may manage and track traffic information and derive travel times, guide driving behavior and optimize road infrastructure for cities. Traffic Message Channel (TMC) and other traffic services deliver traffic information to customers. Traffic incidents and traffic flow are reported through broadcasts. Traffic delays may be caused by one or more of congestion, construction, accidents, special events (e.g., concerts, sporting events, festivals), weather conditions (e.g., rain, snow, tornado), and so on.

The traffic data is collected from probes. The probes may be individual drivers or detection equipment near the road. The individual drivers may travel with tracking devices. The detection equipment may be a loop detector in or near the road that detects passing vehicles. Both of these approaches are based on intermittent samples. The sampling rates may vary (e.g., 10 out of 100 vehicles are detected) but do not provide exact and accurate traffic information. Neither approach provides lane level traffic information.

SUMMARY

Lane level traffic levels are determined based on traffic camera images. A controller aligns a three-dimensional map with a traffic camera view, and identifies multiple lanes in the traffic camera view based on lane delineations of the three-dimensional map. The controller calculates a traffic parameter based on the multiple lanes in image frames from the traffic camera view and provides a traffic graphic based on the traffic parameter.

BRIEF DESCRIPTION OF THE DRAWINGS

Exemplary embodiments of the present invention are described herein with reference to the following drawings.

FIG. 6A illustrates an example table for the graphical traffic indicator.

FIG. 6B illustrates an example table adjusting the region of interest in the camera view.

DETAILED DESCRIPTION

A traffic camera is a video camera that is positioned to record or transmit video data of a road and the vehicles traveling on the road. Traffic cameras may be useful to give a snapshot of the current traffic conditions of the road or to monitor for traffic conditions such as congestion, construction, or accidents. Typically, a user views the video stream and makes a conclusion on traffic conditions based on the visible traffic. However, no traffic data can be easily extracted from the video stream images. The following embodiments extract traffic data from the video stream and provide the traffic data in another type output.

Figure 1:
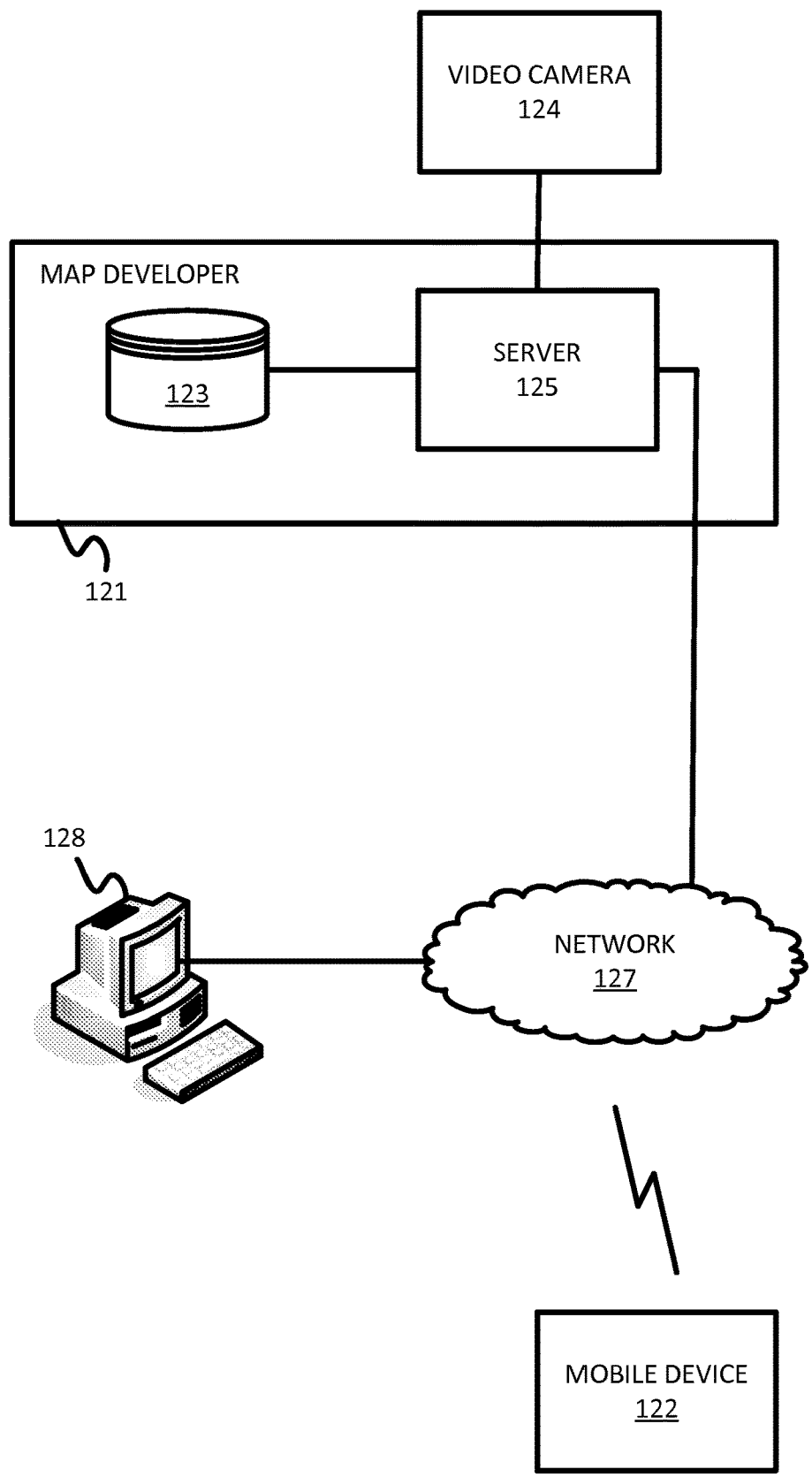
FIG. 1 illustrates an example system for lane level traffic designations.

FIG. 1 illustrates an example system for lane level traffic designations. The system 120 includes a developer system 121, one or more mobile devices 122, a workstation 128, and a network 127. The system 120 may receive a video stream including traffic from video camera 124. Additional, different, or fewer components may be provided. For example, many mobile devices 122 and/or workstations 128 connect with the network 127. The developer system 121 includes a server 125 and a database 123. The developer system 121 may include computer systems and networks of a system operator.

The traffic data is extracted from the video stream through a correlation with three-dimensional map data. The three-dimensional map data may be a high definition map compiled from a point cloud or other optical distancing data (e.g., light distance and ranging (LIDAR) data). The three-dimensional map data may include the locations of paths and more specifically, locations of individual lanes within the paths.

The server 125 may be configured to align three-dimensional map data with a video stream from a traffic camera view. The map and the traffic view may be aligned based on at least one common point and scale factor for the traffic view. That is, at least one point in the traffic view has a known location in the three-dimensional map. The point may be a static point such as the location of the camera which may be measured using a positioning technique (e.g., global positioning system). The point may be a detected point such as indicia in the view of the camera that can be detected from the video (e.g., a survey marker or painted symbol on the road). The scale factor describes the relative size of objects in the traffic camera view, relating real world distances to pixel distances in the traffic camera view. The scale factor may also be based on the indicia in the view of the camera or based on the current focal length of the camera.

The server 125 is configured to identify multiple lanes in the traffic camera view based on lane delineations of the three-dimensional map. The lane delineations may be the geographic locations of individual lanes within one or more paths. The server 125 determines frame locations in the two-dimensional view of the traffic camera that correspond to the locations of individual lanes. The frame locations may be pixel coordinates (e.g., horizontal coordinate and vertical coordinate) for the vertices of vertices of an area for each of the lanes.

The server 125 may be configured to calculate a traffic parameter based on moving objects in the lanes in image frames from the traffic camera view. The traffic parameter may be a speed of the vehicles or a count of the number of vehicles that are traveling in the frame locations in the two-dimensional view that corresponds to the individual lanes. The traffic parameter may be another metric derived from the count of vehicles and time or distance such as the speed of the traffic (distance per unit time), the flow of the traffic (the number of vehicles of passing a reference point per time), or the density of the traffic (the number of vehicles per unit length of the path).

The server 125 may provide the traffic parameter to the mobile device 122 or the workstation 128. The traffic parameter may be in a traffic graphic such as a color-coded indicator, a numeric readout, or an animated object. The animated object may be a gauge (e.g., radial dial indicator), moving vehicle images, or moving arrows.

The mobile device 122 is a smart phone, a mobile phone, a personal digital assistant ("PDA"), a tablet computer, a notebook computer, a personal navigation device ("PND"), a portable navigation device, and/or any other known or later developed portable or mobile computing device. The mobile device 122 includes one or more detectors or sensors as a positioning system built or embedded into or within the interior of the mobile device 122. The mobile device 122 receives location data for geographic position from the positioning system.

The optional workstation 128 is a general purpose computer including programming specialized for the following embodiments. For example, the workstation 128 may receive user inputs for activating lane level designations. The workstation 128 may receive user inputs for manually defining the speed ranges for the color, shading, or alphanumeric labels for traffic designations of the path segment.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components. The computing resources may be divided between the server 125 and the mobile device 122. In some embodiments, the server 125 performs a majority of the processing. In other embodiments, the mobile device 122 or the workstation 128 performs a majority of the processing. In another example, the processing is divided substantially evenly between the server 125 and the mobile device 122 or workstation 128.

Figure 2:
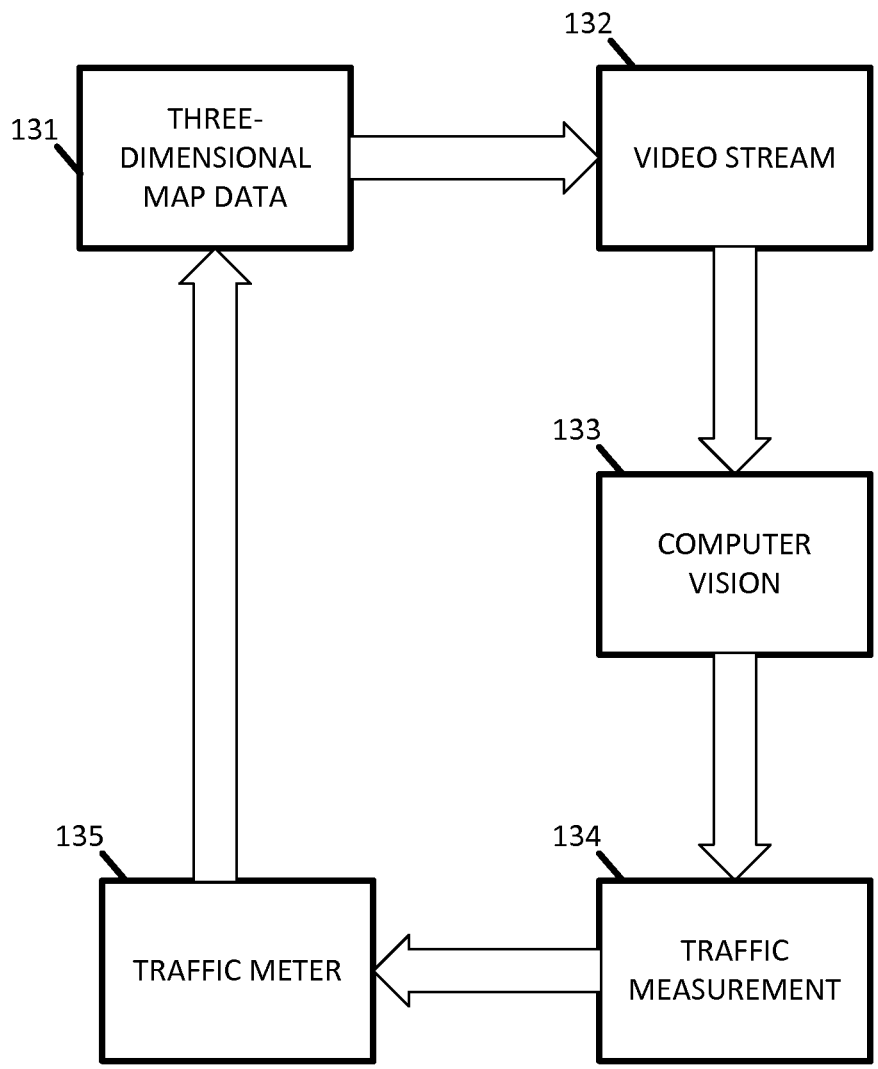
FIG. 2 illustrates example sequence for lane level traffic designations.

FIG. 2 illustrates example sequence for lane level traffic designations. FIG. 2 illustrates not necessarily separate hardware or devices but a general sequence of events of the system of FIG. 1.

The three-dimensional map data 131 is aligned with the video stream 132 of the traffic camera 124. The three-dimensional map data 131 includes three-dimensional locations for objects. The objects may include buildings, points of interest, and pathways. One or more of the pathways include multiple lanes that may be defined according to surfaces, accessors and portals. A surface represents a navigable surface such as a road or intersection. An accessor represents an end node of the pathway and consists of portals. A portal represents represent lane center line location at the accessor and may be used to derive attributes such as lane count and lane width. Lines connecting accessors and/or portals may include control points that define the curvature of the lane, and accordingly, the curvature of the pathway. Lane and road boundaries are detected from the traffic camera images using edge detection and are subsequently aligned with lane models in the map through a sequence of transformation including rotation, scaling and translation.

The three-dimensional map data 131 may be aligned with the video stream 132 using different techniques. The alignment may be based on the focal length or field of view setting of the camera, which specified a range for a focal distance of a camera, providing a scale for the relative sizes of objects in the camera view. The sizes of the lanes in the three-dimensional map data 131 are scaled to the relative size in the camera view based on the focal distance of the camera. The server 125 may be configured to calculate distances to the lanes from the three-dimensional map 131 and correlate between the focal distance and the distances to the lanes to align the three-dimensional map 131 with the traffic camera view.

In another example, the alignment may be based on the sizes of objects in the video stream. One or more of the objects may have dimensions that are known. For example, the width of the lanes may be previously provided (e.g., by physically measuring the width). Other example objects and known dimensions may include a height of a guard rail, a size of a street sign, a distance from the ground to a traffic light, or a length or width of a specific type of vehicle. The relative size of the object in the image is used to calculate the scale for aligning the video stream to the three-dimensional map data.

After the alignment is completed, the server 125 may determine how far the traffic camera is to any point in the video stream and a region of interest in a frame of video stream that corresponds to any object in the three-dimensional map data. The server 125 may calculate a distance to a first lane and determine a location in the traffic camera view for the first lane based on the viewable distance range of the camera and the position of the camera. The server 125 may calculate similar distances for a second lane and any number of additional lanes.

The video stream 132 is augmented using computer vision techniques, as illustrated by the computer vision block 133. Example computer vision techniques include object recognition, motion tracking, foreground detection, and background subtraction. In background subtraction and foreground detection the background and foreground of images are separated. The foreground may be the part of the camera view nearer the observer or video or nearer to the point of view of the video camera 124, and the background may be the part of the camera view farther from the observer or farther from the point of view of the video camera 124.

Alternatively, the background and foreground may be defined according to the objects in the video. The background may include non-moving or static objects, and the foreground may include objects that are moving in the video. Movement of objects may be determined based on a comparison between a current frame and a reference frame. The reference frame (e.g., background frame or background model) may be manually set as an image including no moving objects. The reference frame may be set as the preceding frame (e.g., movement is determined from any consecutive pair of frames). The reference frame may be set as an average of multiple frames over time.

Background subtraction may distinguish between the background and foreground of the camera view using frame differencing, a mean filter, and/or a gaussian average. Frame differencing includes a pixel-by-pixel comparison of intensity values between the reference frame and the current frame. The mean filter average a predetermined number of preceding frames and subtracts the result from the current frame. The gaussian average utilizes a probabilistic density function for a predetermined number of preceding frames. The probabilistic density function includes a mean and a standard deviation that are configurable to determine the degree of a Euclidean distance between pixels in the current frame and the reference frame.

From the augmented video stream 132, the number of vehicles is counted or the speed of traffic is measured, as illustrated by the traffic measurement block 134. The result of the computer vision technique such as background subtraction may be the locations of moving objects in the image. The moving objects may correspond to vehicles. The data representing the moving objects may be filter to remove pedestrians, bicycles, birds and other extraneous mobbing objects that should not be counted as vehicles.

The data from the traffic measurement is used to generate a graphical traffic meter 135. The traffic meter may include a textual output that describes the speed of traffic or the volume of traffic over a time period. The traffic meter may include a graphical object such as a radial dial or a sliding bar that represents the speed of traffic or the volume of traffic. The traffic meter may be added to a map including the three-dimensional map data 131.

Figure 3:
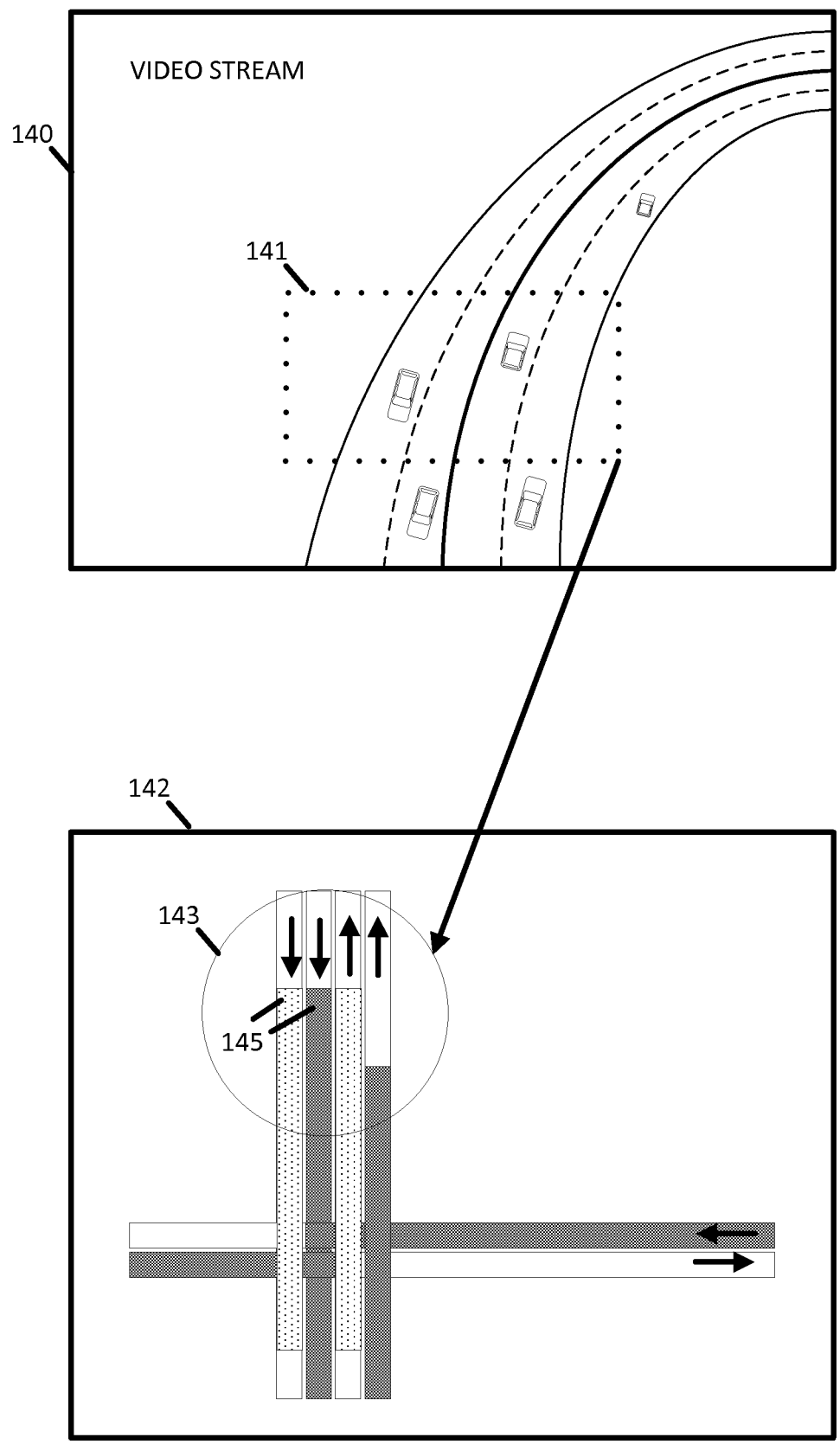
FIG. 3 illustrates an example of a camera view and coordinated traffic parameters.

FIG. 3 illustrates an example video stream 140 of a camera view and coordinated traffic parameters. The video stream 140 may be accessible through an internet protocol (IP) address. The video stream 140 may include captured images at a frame rate. In order to maintain an accurate count of vehicles, the server 125 may determine whether the frame rate meets or exceeds a threshold value. Example threshold values may be 20, 10, or 1 frame per second. If the video stream 140 is less than the threshold, vehicles may pass through the camera view without being included in one of the images. The frame rate may be a function of the type of camera or the bandwidth of the connection with the camera. When the video stream 140 falls below the threshold frame rate, the traffic meter may be modified to indicate that the data may be inaccurate.

The server 125 may identify a region 141 in the video stream 140 that depicts multiple lanes. The region 141 may include a polygon for each of the lanes. The polygons may be defined by the locations of the lanes in the three-dimensional map data, but may also be modified as a function of traffic speed, the frame rate of the video or the type of road. The server 125 may maintain a separate vehicle count for each of the polygons.

An example map 142 may include lane level statistics based on the vehicle measurement. A circle 143 illustrates the portion of the map 142 that corresponds to the region 141 in the video stream. The statistics based on the vehicle measurement may be shown using shadings 145 on individual lanes. For example, a heavy or dark shading may indicate high traffic or low speeds, and lighter shadings may indicate low or medium traffic or higher speeds. No shading may represent no traffic and normal speeds. The map 142 may also include arrows indicative of the direction of travel on each of the lanes.

Figure 4:
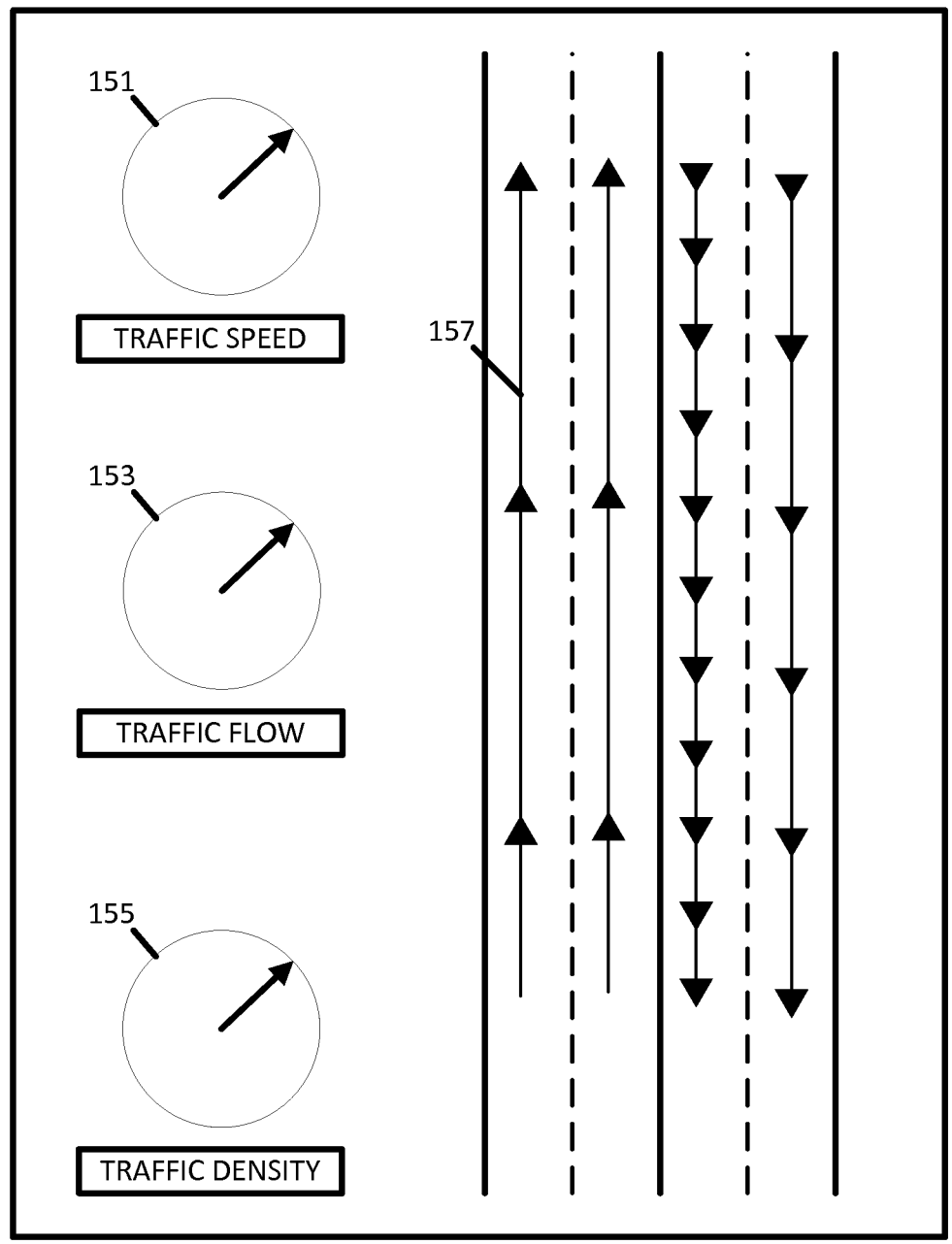
FIG. 4 illustrates an example set of graphical traffic indicators.

FIG. 4 illustrates an example set of graphical traffic indicators. The graphical traffic indicators may include arrows 157. The arrows 157 may reflect traffic congestions on the road. The arrows 157 may be closer together (short spacing distance) to indicate higher traffic and farther apart (large spacing distance). The spacings of the arrows 157 may be dynamically adjusted as the rate of vehicles detected from the camera view. The arrows 157 may be animated to move at a speed on the map that is proportional or based on the traffic statistics of the lanes.

The lane level statistics may include traffic speed, traffic flow, or traffic density. The graphical traffic indicators may include radial gauges (e.g., traffic speed gauge 151, traffic flow 153, and traffic density 155). Traffic speed may be calculated from two or more frames. A distance between a location of an object in one of the frames and the location of the object in another frame divided by the time between the frames may provide traffic speed. The traffic speed may be a running average over multiple successive pairs of image frames. The speeds of multiple vehicles may be averaged or otherwise combined to create a roadway speed. The roadway speed may be a running average over multiple successive pairs of image frames.

Traffic flow may be calculated based on a number of vehicles that pass a reference point over a time period. The number may be extrapolated to vehicles per hour or vehicles per minute. The inverse of flow, headway, provides the amount of time per passing vehicle, which may indicate vehicle spacing in a particular lane.

Traffic density may be calculated based on the number of vehicles per length of the pathway. Traffic density may be directly measured (e.g., identify a quantity of vehicles in the lanes of region 141) or indirectly based on the length of the pathway and the quantity of vehicles. The server 125 may compare the traffic density to a predetermined critical density or traffic jam density. When the current traffic density exceed or is approaching the critical density, the server 125 may generate a warning message that congestion is occurring or may occur.

Figure 5:
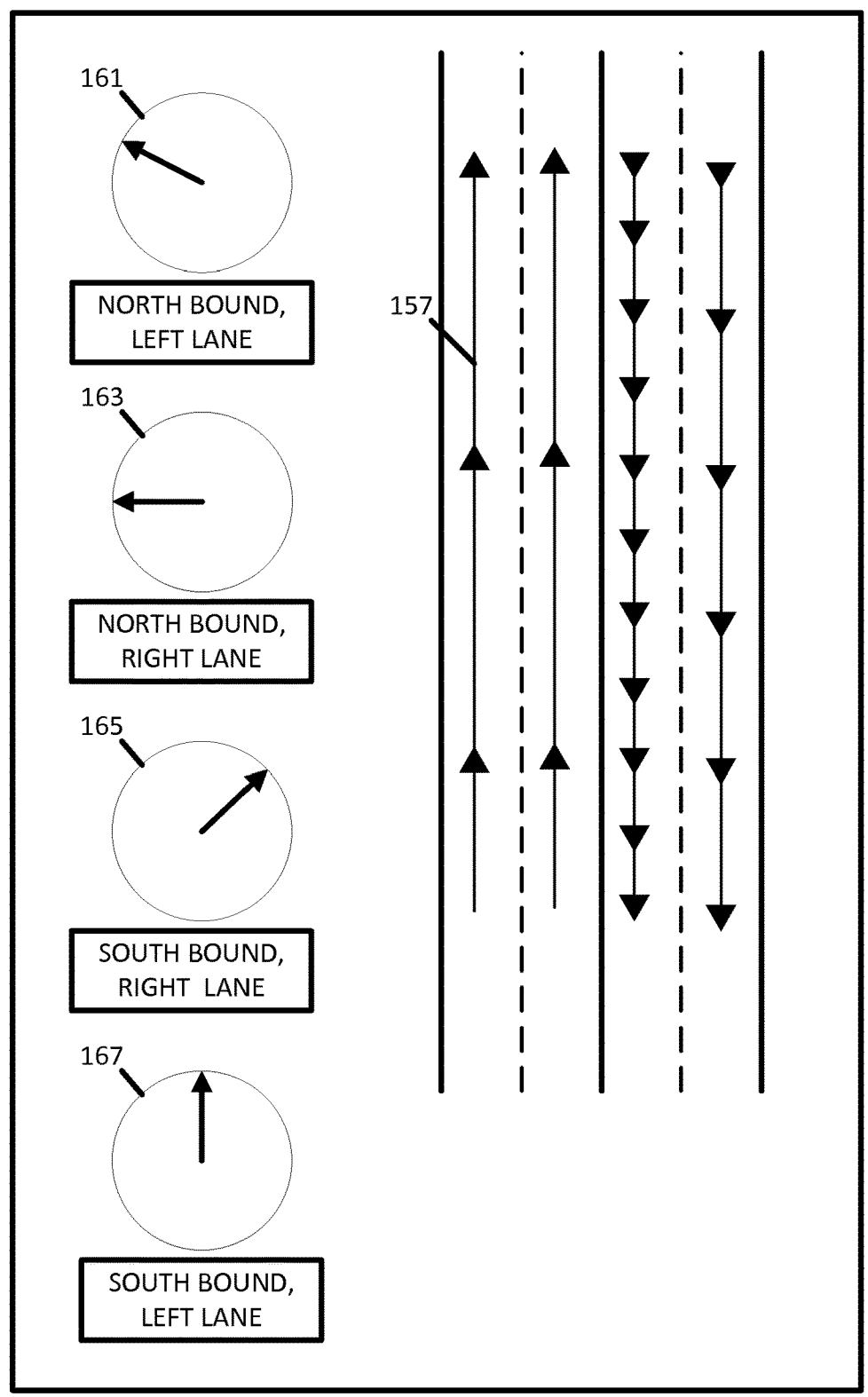
FIG. 5 illustrates another example set of graphical traffic indicators.

FIG. 5 illustrates another example set of graphical traffic indicators. A graphical traffic indicator may be provided for each of multiple lanes. The example of FIG. 5 illustrates a north bound left lane indicator 161, a north bound right lane indicator 163, a south bound left lane indicator 165, and a south bound right lane indicator 167. The indicators may be based on a location specified by the user. The indicators may be based on a current location of a navigation device or a future position of the navigation device. The future position may be identified based on the current speed and direction of the navigation device or based on a route being followed by the navigation device. The user may make a routing decision based on the readouts of the graphical traffic indicators such as making a turn or exiting a freeway. The user may make a lane change decision based on the relative readouts of the multiple lanes.

FIG. 6A illustrates an example table 150 for the graphical traffic indicator. The table 150 associates the position or readout of the graphical traffic indicator with one or more of traffic speed, traffic flow, and traffic density. That is, traffic level may be defined based on traffic speed, traffic flow, or traffic density. The traffic level may be assigned a numeric code. The example shown in table 150 includes 5 numeric codes, each corresponding to a different traffic level (e.g., 1=very light traffic, 2=light traffic, 3=medium traffic, 4=heavy traffic, and 5=very heavy traffic). The traffic levels may be defined by traffic speed such that each traffic level is associated with a different speed range (e.g., 5=0 to 5 mph, 4=6 to 10 mph, 3=11 to 20 mph, 2=21 to 40 mph, and 1=41 to 60 mph or above). The traffic levels may be defined by traffic density such that each traffic level is associated with a different density range (e.g., 1=0 to 1 vehicles per unit length, 2=1 to 2 vehicles per unit length, 3=2 to 3 vehicles per unit length, 4=3 to 4 vehicles per unit length, and 5=4 to 5 vehicles per unit length). Example lengths include 10 feet, 10 meters, and 100 feet. The traffic levels may be defined by traffic flow such that each traffic level is associated with a different traffic flow range (e.g., 1=above 50 vehicles passing the region per unit time, 2=21 to 50 vehicles passing the region per unit time, 3=11 to 20 vehicles passing the region per unit time, 4=6 to 10 vehicles passing the region per unit time, and 5=up to 5 vehicles passing the region per unit time). Example unit durations of time include 10 seconds, 30 seconds, and 1 minute. The various traffic levels may be illustrated by the graphical traffic indicator using different needle positions, different colors, different shadings, or different animation speeds.

In another embodiment, traffic level may be defined based on a combination of two or more of traffic speed, traffic flow, and traffic density. That is, each traffic level may be associated with a traffic speed range and a traffic density range or another combination.

FIG. 6B illustrates an example table 155 adjusting the region of interest in the camera view. The server 125 may adjust the size of the region of interest according to the type of path. The type of path may be a functional classification. For example, for high speed roads (e.g., highways or interstates), a large region of interest may be used because vehicles are generally traveling faster than on a low speed road (e.g., city streets), which uses a smaller region of interest. The size of the region of interest may be set based on both functional classification and traffic. For example, smaller sizes for the region of interest are reduced when the road is under congestion or higher traffic levels. The area of interest column in table 155 lists a coefficient that corresponds to the size of the area of interest (1 means 100% of the possible size of the area of interest, 0.7 means 70% of the possible size of the area of interest, and so on).

One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size.

Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

Figure 7:
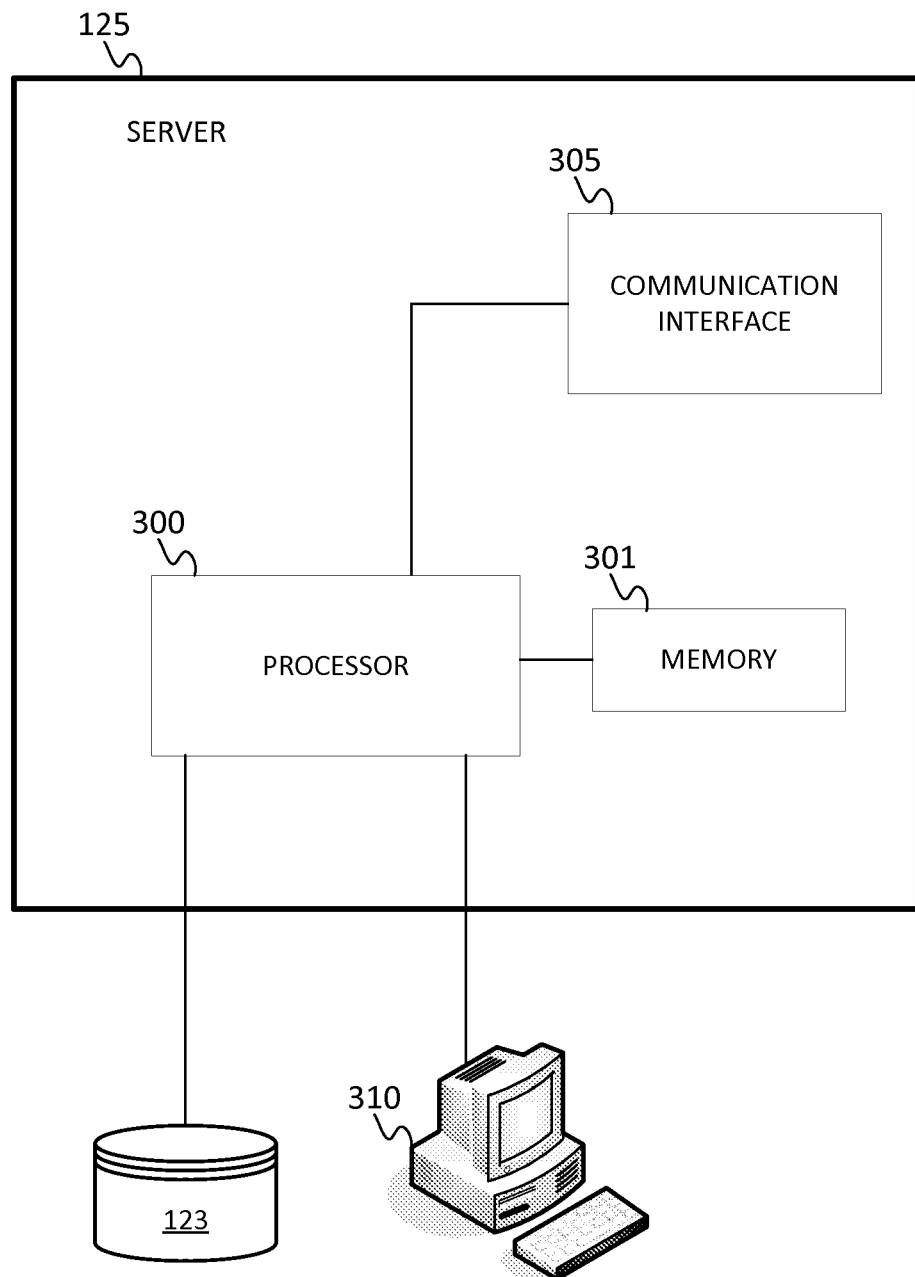
FIG. 7 illustrates an exemplary server of the system of FIG. 1.
Figure 8:
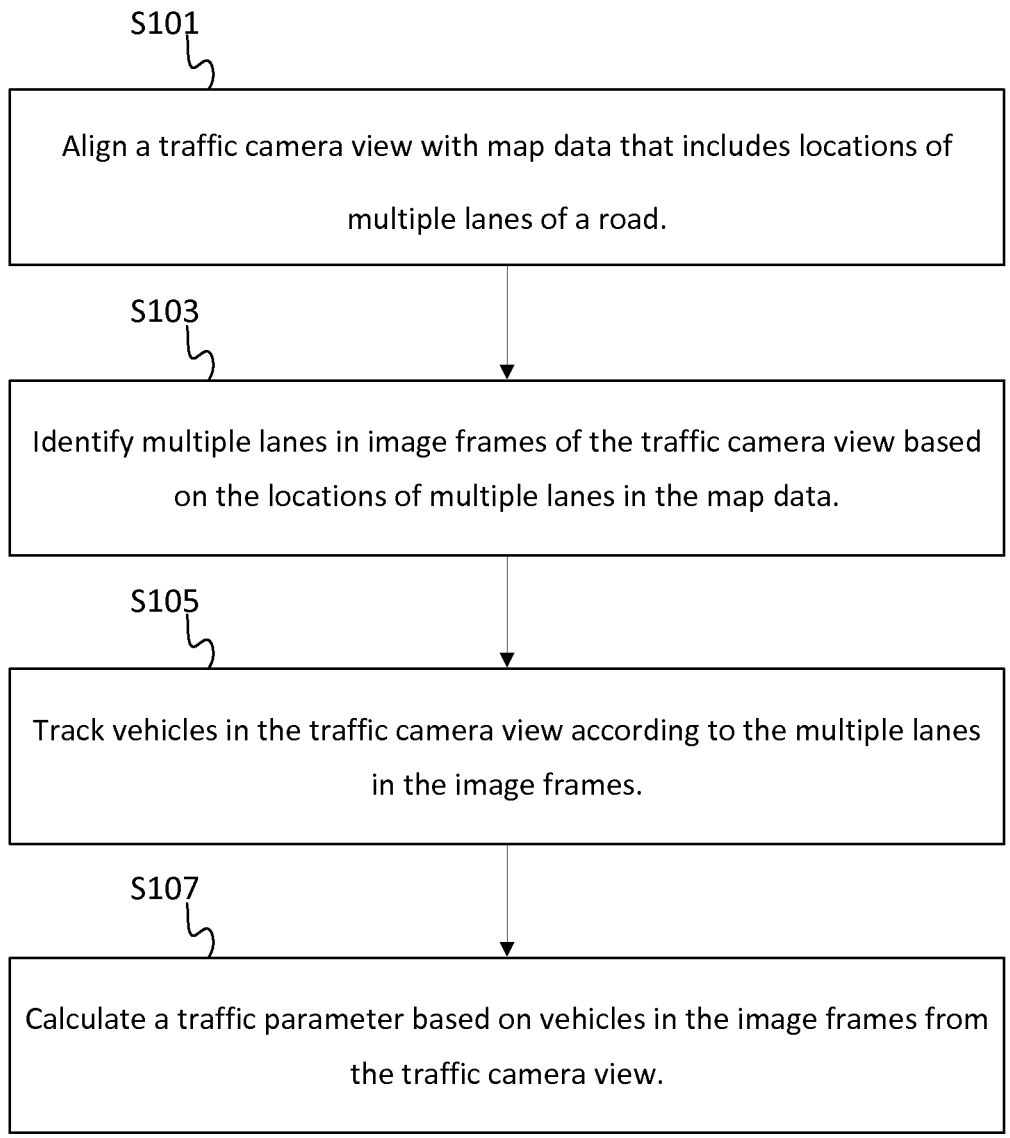
FIG. 8 illustrates example flowchart for the server of FIG. 7.

FIG. 7 illustrates an exemplary server 125 of the system of FIG. 1. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the mobile device 122. Additional, different, or fewer components may be included. FIG. 8 illustrates an example flowchart for lane level traffic distinctions from video. The acts of FIG. 8 may be performed by the server 125 or another device. Additional, different, or fewer acts may be provided.

At act S101, the processor 300 is configured to align a traffic camera view with map data including locations of multiple lanes of a road. The map data may be stored by memory 301 or database 123. The communication interface 305 may receive location data relating to a current location of a navigation device or a location selected through mapping application. The map data is a subset of data selected based on the location. The traffic camera view is a two-dimensional image frame or series of image frames. The map data includes three-dimensional coordinates of geographical objects including the multiple lanes of the road.

At act S103, the processor 300 is configured to identify multiple lanes in image frames of the traffic camera view based on the locations of multiple lanes in the map data. The processor 300 is configured to identify pixels or pixel areas in the image frames that correspond to the multiple lanes in the road. The processor 300 may extrapolate three-dimensional locations in the map that correspond to two-dimensional locations in the image based on at least one common reference point and a viewable range. The common reference point may include the installation location of the camera, and the viewable range may be based on the focal length of the camera.

At act S105, the processor 300 is configured to track vehicles in the traffic camera view according to the multiple lanes in the image frames. The processor 300 may remove substantially all portions of the image except the moving vehicles using background subtraction. The processor 300 may track the vehicles in the lanes from a first video frame to a subsequent video frame. A count of vehicles or a speed of vehicles may be based on a difference in the positions of the vehicles from the first video frame to the subsequent video frame.

At act S107, the processor 300 is configured to calculate a traffic parameter based on vehicles in the image frames from the traffic camera view. The traffic parameter is based on the count of vehicles and/or the speed of the vehicles. The count of vehicles over time that pass a predetermined pixel distance in the image frame relates to a real world distance in the map data. The speed of vehicles may be average over time based on relative locations of the same vehicles in adjacent image frames.

The processor 300 may modify a display of the map including the multiple lanes based on the traffic parameter may. A moving indicator may be overlaid on the road that indicates traffic level or an object may be displayed adjacent to the road, as discussed above.

Figure 9:
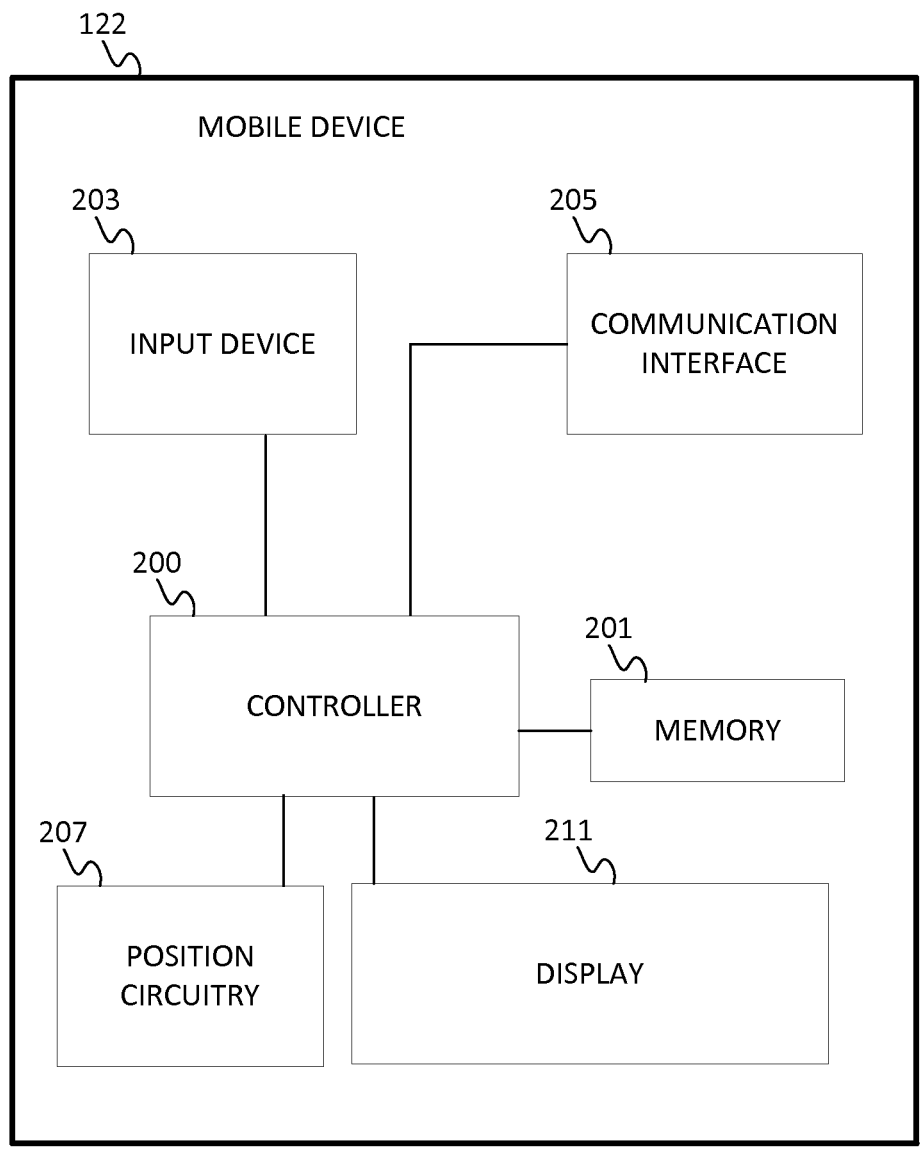
FIG. 9 illustrates an exemplary mobile device of the system of FIG. 1.
Figure 10:
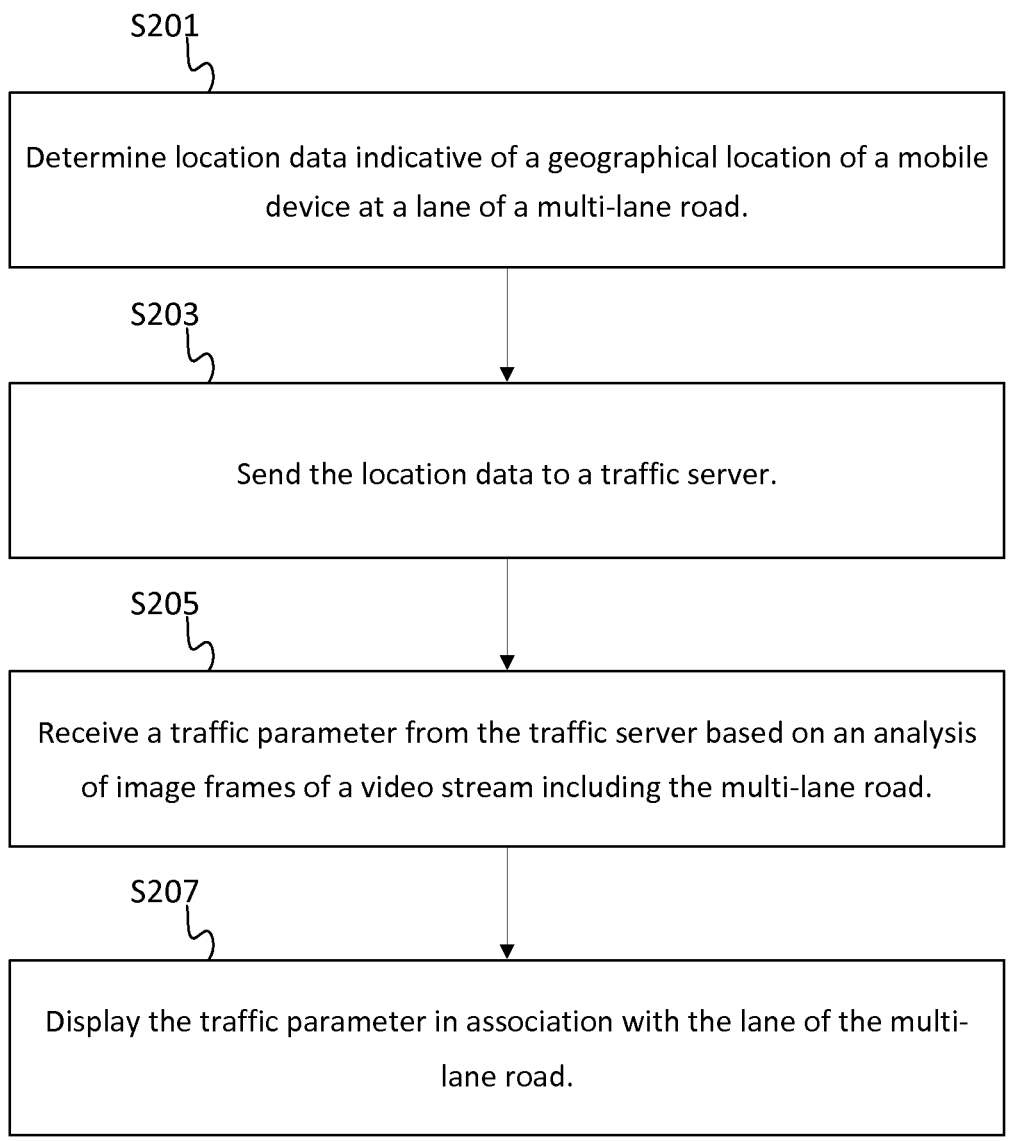
FIG. 10 illustrates an example flowchart for the mobile device of FIG. 9.

FIG. 9 illustrates an exemplary mobile device 122 of the system of FIG. 1. The mobile device 122 may be referred to as a navigation device. The mobile device 122 includes a controller 200, a memory 201, an input device 203, a communication interface 205, position circuitry 207, and a display 211. The workstation 128 may include at least a memory and processor and may be substituted for the mobile device in the following. FIG. 10 illustrates an example flowchart for lane level traffic determination. The acts of FIG. 10 may be performed by the mobile device 122 or another device. Additional, different, or fewer acts may be provided.

At act S201, the position circuitry 207 or the controller 200 may determine location data indicative of a geographical location of a mobile device. The geographic location may correspond a specific lane of a multi-lane road or the road in general. At act S203, the communication interface 205 or the controller 200 sends the location data to a traffic server. The traffic server determines traffic levels for the lane of the multi-lane road or multiple traffic levels for multiple lanes of the multi-lane road. The traffic levels are based on an analysis of image frames of a video stream including the multi-lane road.

At act S205, the communication interface or the controller 200 receives a traffic parameter from the traffic server. At act S207, the controller 200 provides and/or the display 211 displays the traffic parameter in association with the lane of the multi-lane road. The traffic parameter may include traffic levels for the current lane that the mobile device 122 is traveling in. The traffic parameter may include traffic levels in adjacent lanes that a driver may have the option to maneuver the vehicle into. For example, the user may be shown upcoming traffic levels in one lane to the left of the current lane and one lane to the right of the current lane. The user may make a lane change decision based on the traffic parameter. The mobile device 122 may directly instruct the user to change lanes based on upcoming traffic levels.

The traffic parameters may also be used for autonomous driving. In addition or the alternative to traffic reporting, the traffic values may be used to provide functions for an autonomous vehicle. An autonomous vehicle is self-driving and may be referred to as a robot vehicle or an automated vehicle. The autonomous vehicle may include passengers but no driver is necessary. The mobile device 122 or another computer system in communication with the mobile device 122 may include instructions for routing the vehicle or operating the vehicle. An estimated travel time may be calculated based on the traffic values and a route may be chosen based on the estimate travel time. The computing system may generate driving commands for steering the vehicle, shifting gears, increasing and decreasing the throttle, and braking based on the traffic parameter. For example, when the traffic parameter indicates stop and go driving, the computing system of multiple autonomous vehicles may increase the spacing between vehicles to smooth out traffic congestion. The computing system may slow vehicles that are approaching congested areas. The computing system may generate auxiliary commands for controlling the headlights, turn signals, windshield wipers, defrost, or other auxiliary functions not directly related to the movement of the vehicle.

The autonomous vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous vehicle may optically track and follow lane markings or guide markings on the road.

In addition, the server 125 may monitor user behavior in the image frames to impact autonomous driving algorithms. The server 125 may determine how the average driver changes lanes. The server 125 may compare a series of image frames to determine how long users typically take to move from one lane to another lane, the angle of movement from one lane to another lane, and the speed or change in speed of vehicles as they move from one lane to another lane. The server 125 may compare a series of image frames to determine how users speed up or slow down, how much space they typically leave between vehicles, or how they adjust speeds based on lane changes by other vehicles. The server 125 may apply these measurements to an autonomous driving algorithm in order to make the autonomous control feel more like a human driver.

The database 123 may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities. The road link data records may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The node data records may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include GPS, Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method for determining lane level traffic information including a traffic parameter, the method comprising:
obtaining image frames from a camera having a traffic camera view of a multiple lane road;
aligning, with a processor, a three-dimensional map with the traffic camera view of the multiple lane road, the three-dimensional map and the traffic camera view having at least one common point with a known location;
identifying a region of interest in the image frames of the traffic camera view, wherein the region of interest of a respective image frame is a part of the respective image frame;
identifying a plurality of lanes in the region of interest in the image frames of the traffic camera view based on lane delineations of the three-dimensional map, wherein identifying the plurality of lanes comprises detecting lane boundaries from the image frames of the traffic camera view using edge detection and subsequently aligning the lane boundaries with lane models in the three-dimensional map through a sequence of transformation;
tracking vehicles in the plurality of lanes in the region of interest between image frames of the traffic camera view;
calculating the traffic parameter based on the vehicles in the region of interest in image frames of the traffic camera view, wherein the traffic parameter comprises traffic density;
adjusting a size of the region of interest in the image frames of the traffic camera view of the multiple lane road based on the traffic density; and
causing the lane level traffic information including the traffic parameter to be provided to a mobile device or a workstation.

2. The method of claim 1, wherein aligning the three-dimensional map with the traffic camera view comprises: calculating a focal distance of the camera for the traffic camera view; calculating a distance to the plurality of lanes from the three-dimensional map; and determining a correlation between the focal distance and the distance to the plurality of lanes.

3. The method of claim 2, wherein the correlation is based on a predetermined dimension of an object in the traffic camera view, wherein the predetermined dimension of the object is a length of a car or a width of a path.

4. The method of claim 1, wherein the traffic parameter is based on a difference in the positions of the vehicles between image frames.

5. The method of claim 1, wherein aligning the three-dimensional map with the traffic camera view comprises: identifying a position of the camera for the traffic camera view; identifying a viewable distance range of the camera; calculating a first distance to a first lane of the plurality of lanes; and determining a first image location in the traffic camera view for the first lane based on the first distance and the viewable distance range to the position of the camera.

6. The method of claim 5, further comprising: calculating a second distance to a second lane of the plurality of lanes; and determining a second image location in the traffic camera view for the second lane based on the second distance and the viewable distance range to the position of the camera.

7. The method of claim 1, wherein the traffic parameter includes data for each of the plurality of lanes.

8. The method of claim 1, wherein the plurality of lanes travel in a same direction and the traffic parameter includes data for each of the plurality of lanes in the same direction.

9. The method of claim 1, further comprising one or more of:
providing a traffic graphic based on the traffic parameter, wherein the traffic graphic includes a color or shading indicator; adding the traffic parameter to a user interface including map data;
and modifying an illustration of the road based on the traffic parameter.

10. The method of claim 1, wherein causing the lane level traffic information including the traffic parameter to be provided comprises providing the traffic parameter to the mobile device.

11. The method of claim 1, further comprising determining at least one of an average lane change duration, an average lane change angle, or an average lane change speed based on the vehicles in the region of interest in image frames of the traffic camera view.

12. The method of claim 1, wherein adjusting the size of the region of interest in the image frames of the traffic camera view of the multiple lane road comprises adjusting the size of the region of interest to have an inverse relationship to the traffic density.

13. The method of claim 1, wherein adjusting the size of the region of interest in the image frames of the traffic camera view of the multiple lane road is also based on a functional class of the road.

14. An apparatus configured to determine lane level traffic information including a traffic parameter, the apparatus comprising:
at least one processor; and
at least one memory including computer program code for one or more programs; the at least one memory and the computer program code configured to, with the at least one processor, cause the apparatus to at least perform:
align a three-dimensional map with a traffic camera view of a multiple lane road, the three-dimensional map and the traffic camera view having at least one common point with a known location;
identify a region of interest in image frames of the traffic camera view, wherein the region of interest of a respective image frame is a part of the respective image frame;
identify a plurality of lanes in the region of interest in image frames of the traffic camera view based on lane delineations of the three-dimensional map, wherein the plurality of lanes are identified by detecting lane boundaries from the image frames of the traffic camera view using edge detection and subsequently aligning the lane boundaries with lane models in the three-dimensional map through a sequence of transformation;
track vehicles in the plurality of lanes in the region of interest between image frames of the traffic camera view;
calculate the traffic parameter based on the vehicles in the region of interest in image frames from the traffic camera view, wherein the plurality of lanes travel in a same direction and the traffic parameter includes data for each of the plurality of lanes in the same direction, wherein the traffic parameter comprises traffic density;
adjust a size of the region of interest in the image frames of the traffic camera view of the multiple lane road based on the traffic density; and
cause the lane level traffic information including the traffic parameter to be provided to a mobile device or a workstation.

15. The apparatus of claim 14, wherein the traffic parameter is added to a user interface including map data.

16. The apparatus of claim 14, wherein the traffic camera view is aligned with map data based on a focal distance of a camera and distances of the lanes.

17. The apparatus of claim 14, wherein the at least one memory and the computer program code are configured to, with the at least one processor, cause the apparatus to cause the lane level traffic information including the traffic parameter to be provided by transmitting the traffic parameter to the mobile device.

18. The apparatus of claim 14, wherein the traffic camera view is aligned with map data based on a predetermined dimension of an object in the traffic camera view.

19. The apparatus of claim 14, wherein the vehicles are counted in the image frames using background subtraction.

20. The apparatus of claim 14, wherein the at least one memory and the computer program code are configured to, with the at least one processor, cause the apparatus to adjust the size of the region of interest in the image frames of the traffic camera view of the multiple lane road by adjusting the size of the region of interest to have an inverse relationship to the traffic density.

21. The apparatus of claim 14, wherein the at least one memory and the computer program code are configured to, with the at least one processor, cause the apparatus to adjust the size of the region of interest in the image frames of the traffic camera view of the multiple lane road based also on a functional class of the road.

22. A non-transitory computer readable medium configured to determine lane level traffic information including a traffic parameter, the computer readable medium including instructions that when executed on a computer are operable to:
align a three-dimensional map with a traffic camera view of a multiple lane road, the three-dimensional map and the traffic camera view having at least one common point with a known location;
identify a region of interest in image frames of the traffic camera view, wherein the region of interest of a respective image frame is a part of the respective image frame;
identify a plurality of lanes in the region of interest in image frames of the traffic camera view based on lane delineations of the three-dimensional map, wherein the plurality of lanes are identified by detecting lane boundaries from the image frames of the traffic camera view using edge detection and subsequently aligning the lane boundaries with lane models in the three-dimensional map through a sequence of transformation;
track vehicles in the plurality of lanes in the region of interest between image frames of the traffic camera view;
calculate the traffic parameter based on the vehicles in the region of interest in image frames from the traffic camera view, wherein the plurality of lanes travel in a same direction and the traffic parameter includes data for each of the plurality of lanes in the same direction, wherein the traffic parameter comprises traffic density;
adjust a size of the region of interest in the image frames of the traffic camera view of the multiple lane road based on the traffic density; and
cause the lane level traffic information including the traffic parameter to be provided to a mobile device or a workstation.

23. The non-transitory computer readable medium of claim 22 wherein the instructions operable to cause the lane level traffic information including the traffic parameter to be provided comprise instructions that when executed on the computer are operable to: transmit the traffic parameter to the mobile device.

24. The non-transitory computer readable medium of claim 22, wherein the instructions operable to adjust the size of the region of interest in the image frames of the traffic camera view of the multiple lane road comprise instructions that when executed on the computer are operable to adjust the size of the region of interest to have an inverse relationship to the traffic density.

25. The non-transitory computer readable medium of claim 22, wherein the instructions operable to adjust the size of the region of interest in the image frames of the traffic camera view of the multiple lane road comprise instructions that when executed on the computer are operable to adjust the size of the region of interest in the image frames of the traffic camera view of the multiple lane road based on a functional class of the road.

* * * * *

UNITED STATES PATENT AND TRADEMARK OFFICE
CERTIFICATE OF CORRECTION

PATENT NO.       : 10,846,540 B2
APPLICATION NO.  : 15/686297
DATED            : November 24, 2020
INVENTOR(S)      : Chen et al.

It is certified that error appears in the above-identified patent and that said Letters Patent is hereby corrected as shown below:

On the Title Page

Related U.S. Application Data:
"Continuation-in-part of application No. 14/324,797"
Should read:
--Continuation of application No. 14/324,797--

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*